(No Model.) 2 Sheets—Sheet 1.
F. OGDEN.
GEAR FOR TRACTION ENGINES.
No. 250,955. Patented Dec. 13, 1881.
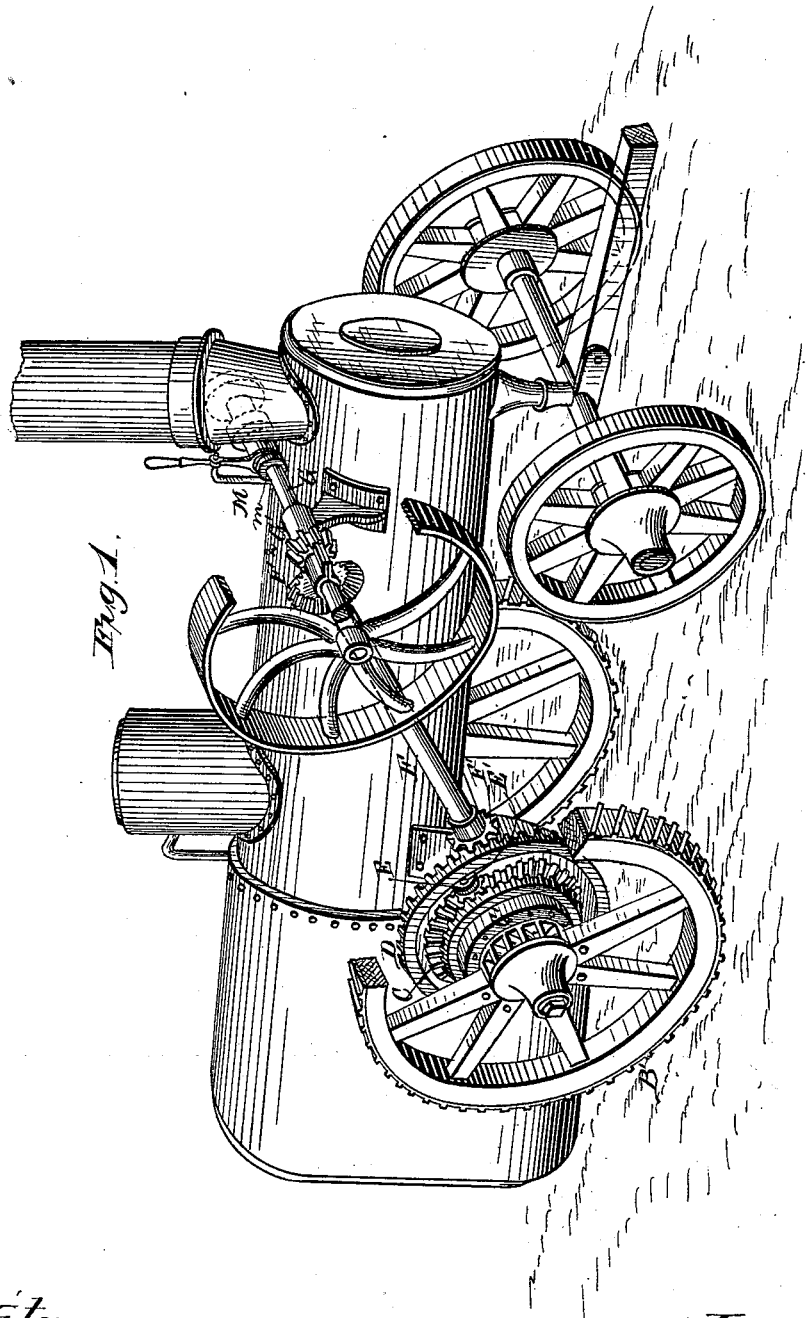
Witnesses.
F. L. Durand
John G. Center
Inventor
Ferris Ogden
by A. M. Smith & Co.
Attorneys

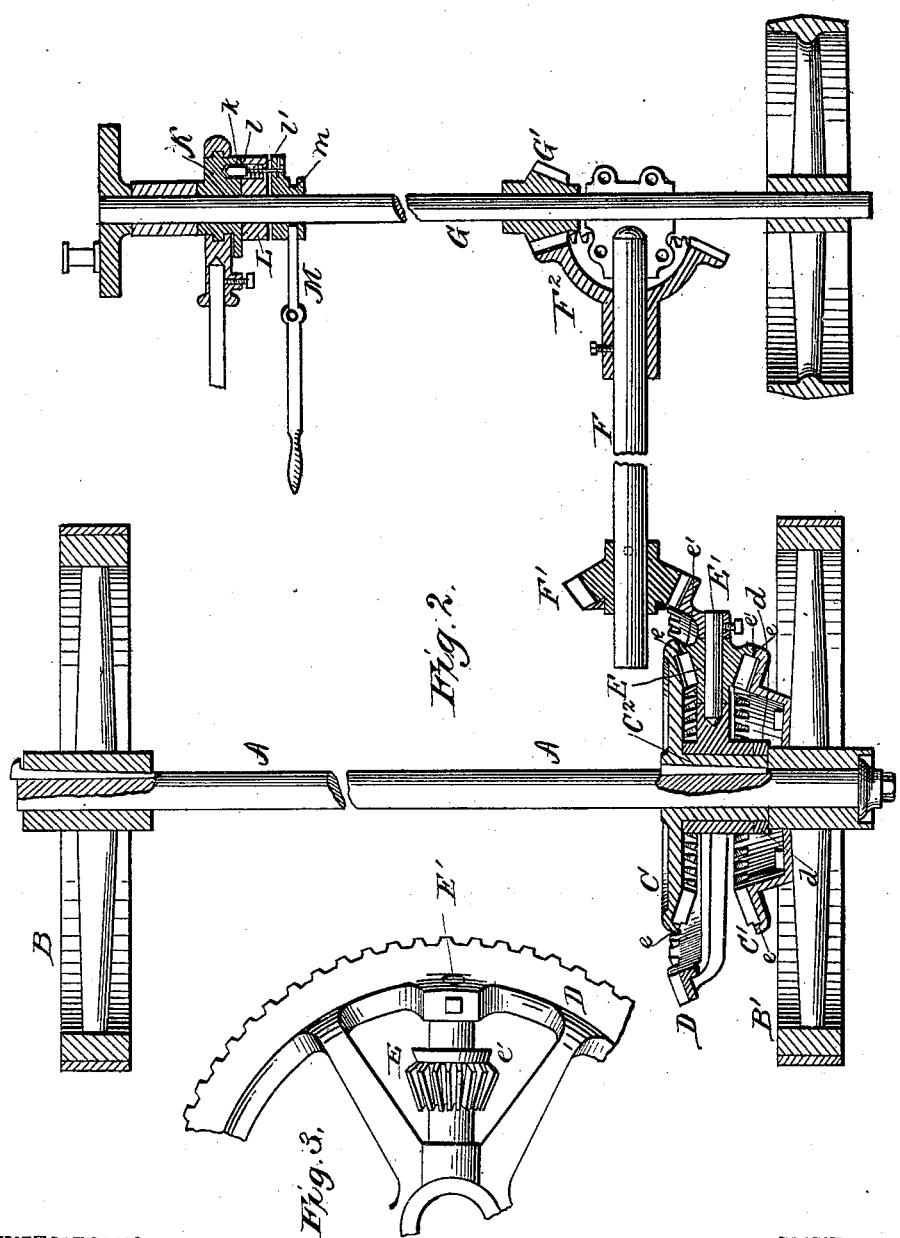

UNITED STATES PATENT OFFICE.

FERRIS OGDEN, OF MANSFIELD, OHIO, ASSIGNOR TO THE AULTMAN & TAYLOR COMPANY, OF SAME PLACE.

GEAR FOR TRACTION-ENGINES.

SPECIFICATION forming part of Letters Patent No. 250,955, dated December 13, 1881.

Application filed January 19, 1881. (No model.)

*To all whom it may concern:*

Be it known that I, FERRIS OGDEN, of Mansfield, county of Richland, State of Ohio, have invented certain new and useful Improvements in Compensating-Gear for Traction-Engines, of which the following is a full, clear, and exact description, reference being had to the accompanying drawings, making part of this specification, in which—

Figure 1 is a perspective view of my improved engine, with the belt-wheel partly broken away to show the arrangement of parts. Fig. 2 represents a sectional view of so much of my improved gearing as is necessary to show my invention, and Fig. 3 is a side elevation of a portion of the main bevel or master wheel.

The invention relates to a novel construction of the bevel compensating-gear of a traction-engine, whereby the bevel-gear wheels and the interposed pinions carried by the main or master wheel are made to mesh at uniform depth and the frictional resistance to their action greatly reduced; and it consists in providing the bevel-pinions carried by the master-wheel, and the bevel-gears engaging with said pinions on opposite sides, with beveled rolling surfaces conforming to the pitch-lines of the teeth of the respective wheels or pinions on which they are formed, whereby said pinions are adapted to act as anti-friction rollers between the bevel-gears, one of which is fast and the other loose on the same shaft with the master-wheel; and it further consists in the employment, in combination with said compensating-gear, of an adjustable collar for holding the master-wheel, which is loose on the axle, up in proper relation to the bevel-gear fast on said axle, and thereby removing the lateral thrust of said bevel-gear from the hub of the traction-wheel, which is loose on the axle, as hereinafter explained.

It further consists in combining said bevel compensating-gearing with a shifting or reversible eccentric on the main engine-shaft for reversing the direction of rotation of said shaft, as hereinafter described.

The machine or engine, in its general arrangement of parts or organization, may be similar to those now in use, and need not, therefore, be described in detail further than is necessary to an understanding of my improvements.

In the accompanying drawings, A represents the main drive or traction wheel axle, and B B' the traction-wheels mounted thereon. One of these wheels, B, turns loosely on the axle held in place between the hub of a bevel-wheel, C', or collar and the nut or washer on the end of said axle, as shown, and the other, B', is keyed to and turns with the axle. The wheel B has a bevel-wheel, C, bolted or otherwise firmly secured to and turning it or with it, and the bevel-wheel C', which is the counterpart of and faces wheel C, is keyed to and turns with the axle and wheel B', or rather communicates motion to said wheel and axle.

Upon the hub or sleeve $c^2$ of bevel-wheel C' is mounted loosely the main bevel or master wheel D, held in place by an adjustable collar, $d$, on the outer end of the sleeve $c^2$, as shown, for preventing lateral play or end-thrust of the hub of wheel D on the hub of wheel C'. The wheel D is provided, between its hub and toothed bevel-rim, with radial shafts $e$, (three, more or less,) secured in suitable sockets or bearings, as shown in Fig. 3, and upon these shafts are mounted loosely rotating pinions E, which engage with the bevel-wheels C and C', and which may either lock said wheels and cause them to rotate together, or may roll between them, for permitting a variation in the movement of said wheels, as will be explained.

The gears C and C' have annular flanges $e$ at the base of their teeth, having beveled plane faces corresponding to their pitch-lines, as have also the pinions E, as shown at $e'$. These surfaces roll together and prevent the thrust of the driving bevel-pinion on the inclined shaft, hereinafter referred to, from forcing the master-wheel out of position. The adjustable collar $d$ keeps the pinions E E in engagement with the wheel C, and there being one or more of these pinions always on the side opposite to the driving-pinion, the surfaces $e'$ bearing on the wheel C' on one side, and the adjustable collar $d$ against the hub of the master-wheel on the other, the thrust of the driving-pinion is thus thrown upon the bevel-wheel C, which is firmly keyed to the axle, thereby preventing the thrusting outward of the driving-wheel B' against its retaining-nut or washer. These rolling surfaces $e\ e'$ cause the bevel-wheels and pinions also to mesh always at a uniform depth, and thereby prevent them from binding or working heavily. By this arrangement of rolling surfaces on the interposed pinions journaled in the master-wheel and upon the faces of the opposing bevel-wheels meshing with said pinions upon opposite sides, it will be seen that one bevel-wheel is made to form a base or support for the roller moved or rotated thereon by the movement relatively thereto of the other wheel, or, in other words, the rolling surfaces on the pinions and the opposing bevel-gears cause said pinions to act as anti-friction rollers between two surfaces moving relatively in opposite directions, thereby greatly reducing the friction as compared with the compensating-gearings heretofore in use, and particularly adapting such gearing to the heavy work of this class of engines.

The main bevel or master wheel D engages with and is actuated by a bevel-wheel, F', on the lower rear end of the inclined shaft F, which at its upper end has a bevel-wheel, $F^2$, engaging with and operated by means of a bevel-wheel, G', on the main engine or crank shaft G.

By the arrangement described it will be seen that when motion is imparted to the inclined shaft F from the engine-shaft G the bevel-wheel F' causes the master-wheel D to rotate, and the latter carrying the pinions E engaging the bevel-wheels C C', the latter are caused to rotate with the master-wheel, carrying the traction-wheels with them, and thus propelling the machine or engine over the ground; or the pinions may roll between said bevel-wheels, and thereby permit a movement of one relative to the other, as may be necessary, for allowing one of the traction-wheels to move more slowly than the other, thereby facilitating the turning of the machine or engine.

The main engine or crank shaft has an eccentric, K, mounted loosely upon it, the hub or collar of which has two sockets formed in its vertical end or face, on opposite sides of the shaft relative to the throw of the eccentric, one of said sockets being shown at $k$, Fig. 2. Adjacent to said side or end of the eccentric hub or collar is a collar, L, secured to and rotating with the crank-shaft, and provided with a sliding pin, $l$, which engages with the eccentric by entering one or the other of said sockets $k$, being held therein by a spring, $l'$. The shank of pin $l$ extends through the collar L, and at its outer end, opposite that engaging with the eccentric, is secured to a sliding collar, $m$, grooved to receive the fork on the end of a shifting-lever, M, pivoted in any suitable support on the machine or engine in convenient position to be operated by the attendant. By this arrangement the eccentric, through which movement is imparted to the valve in the usual manner, can be disconnected from the crank-shaft, and the latter moves on without the eccentric until the pin $l$ enters the socket $k$ opposite that from which it was withdrawn, thereby reversing the movement of the engine and the direction of rotation of the main engine-shaft G, and consequently reversing the direction of rotation of the compensating-gearing described, and of the traction-wheels themselves. Thus the engine can be moved in either direction over the road and can be readily turned to the right or left, being controlled at will by the attendant.

Parts of the engine not particularly described may be constructed and arranged in any usual or preferred manner.

Having now described my invention, I claim—

1. In a traction-engine, the master bevel-wheel carrying the freely-rotating bevel-pinions provided with the plane rolling surfaces, in combination with the bevel-wheels on the main traction-wheel axle engaging said bevel-pinions on opposite sides and provided with similar rolling surfaces, substantially as described.

2. The bevel-wheels on the main traction-wheel axle and the loosely-rotating bevel-pinions mounted in bearings in the master-wheel, also on said axle, said bevel-wheels being provided with rolling surfaces, as described, in combination with the adjustable collar for setting and holding the master-wheel and its pinions in the required working relation to the bevel-wheels, substantially as described.

FERRIS OGDEN.

Witnesses:
HENRY D. CULLER,
HUNTINGTON BROWN.